(12) United States Patent
Zhao et al.

(10) Patent No.: US 10,104,373 B2
(45) Date of Patent: Oct. 16, 2018

(54) CONTENT BASED VIDEO ENCODING FOR WIRELESS DISPLAY

(71) Applicant: Intel Corporation, Santa Clara, CA (US)

(72) Inventors: Bo Zhao, Shanghai (CN); Yunbiao Lin, Shanghai (CN); Changliang Wang, Bellevue, WA (US); Yue Xiong, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 92 days.

(21) Appl. No.: 15/128,931

(22) PCT Filed: Dec. 18, 2015

(86) PCT No.: PCT/CN2015/097789
§ 371 (c)(1),
(2) Date: Sep. 23, 2016

(87) PCT Pub. No.: WO2017/101091
PCT Pub. Date: Jun. 22, 2017

(65) Prior Publication Data
US 2018/0048888 A1    Feb. 15, 2018

(51) Int. Cl.
*H04N 7/12* (2006.01)
*H04N 11/02* (2006.01)
(Continued)

(52) U.S. Cl.
CPC ......... *H04N 19/103* (2014.11); *H04N 19/136* (2014.11); *H04N 19/23* (2014.11)

(58) Field of Classification Search
CPC .... H04N 19/103; H04N 19/136; H04N 19/23; H04N 19/21; H04N 19/27
(Continued)

(56) References Cited

U.S. PATENT DOCUMENTS 9,160,470 B2     10/2015   Mäkipää et al.
2012/0147961 A1*  6/2012   Guo ..................... H04N 19/56
                                                       375/240.16
(Continued)

FOREIGN PATENT DOCUMENTS

CN      1640026      7/2005
CN      1705372     12/2005
(Continued)

OTHER PUBLICATIONS

International Search Report and Written Opinion for International Patent Application No. PCT/CN2015/097789, dated Sep. 12, 2016.
(Continued)

*Primary Examiner* — Jared Walker
(74) *Attorney, Agent, or Firm* — Green, Howard & Mughal LLP.

(57) ABSTRACT

Techniques related to content based encoding of video content for transmission and display via a remote device are discussed. Such techniques may include collecting graphics properties for graphics layers of a frame of a video sequence, determining encode settings based on the graphics properties, and coding the frame of the video sequence for wireless transmission based on the encode settings.

20 Claims, 7 Drawing Sheets

(51) Int. Cl.
    *H04N 11/04*     (2006.01)
    *H04N 19/103*    (2014.01)
    *H04N 19/136*    (2014.01)
    *H04N 19/23*     (2014.01)

(58) Field of Classification Search
    USPC .................................................. 375/240.16
    See application file for complete search history.

(56) References Cited

U.S. PATENT DOCUMENTS

| | | |
|---|---|---|
| 2014/0223369 A1 | 8/2014 | Wielgosz |
| 2015/0016545 A1* | 1/2015 | Ramasubramonian ...................... H04N 19/29 375/240.25 |
| 2015/0117515 A1* | 4/2015 | Fu ........................ H04N 19/103 375/240.02 |

FOREIGN PATENT DOCUMENTS

| | | |
|---|---|---|
| CN | 101610411 | 12/2009 |
| CN | 102845062 | 12/2012 |
| CN | 103986935 | 8/2014 |

OTHER PUBLICATIONS

International Preliminary Report on Patentability for International Patent Application No. PCT/CN15/97789, dated Jun. 28, 2018

* cited by examiner

CONTENT BASED VIDEO ENCODING FOR WIRELESS DISPLAY

CLAIM OF PRIORITY

This Application is a National Stage Entry of, and claims priority to, PCT Application No. PCT/CN2015/097789, filed on 18 Dec. 2015 and titled "CONTENT BASED VIDEO ENCODING FOR WIRELESS DISPLAY", which is incorporated by reference in its entirety for all purposes.

BACKGROUND

Wireless display is becoming a popular feature for mobile devices such as ultrabooks, tablets, and smart phones. For example, via wireless display, a higher quality visual experience may be provided to users by displaying content to a larger screen via a TV, monitor, or the like. Such wireless display techniques may cast video content, gaming content, desktop content, or any other suitable content from a local display to a remote display with high picture quality.

In some contexts, to cast the local screen to a remote large screen, the frame buffer for the local display may be encoded with an Advanced Video Coding (AVC; H.264/MPEG-4 AVC) video coding standard, for example, and the coded stream may be sent to a remote receiver via Wi-Fi (e.g., using peer-to-peer techniques, tunnel direct link setup techniques, or the like). At the receiver (e.g., sink) side, the stream may be decoded and the resultant video may be displayed. As discussed, currently, the AVC standard may be employed. However, other video coding standards may be used such as the High Efficiency Video Coding (HEVC) standard or the like. Such standards may provide higher resolutions and better visual quality. Furthermore, in wireless display, providing an original video stream to the receiver (e.g., instead of locally decoding and encoding the stream) may provide advantages in terms of computational efficiency and video quality. Therefore, video encoding may be used for desktop and gaming content in the context of wireless display techniques.

However, current encode techniques may be designed for naturally captured video from a camera and may not be efficient for encoding computer generated content such as desktop and gaming content. As such, existing techniques do not provide efficient, high quality encoding for wireless transmission of image content for remote display. Such problems may become critical as the desire to present high quality image content via wireless display becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
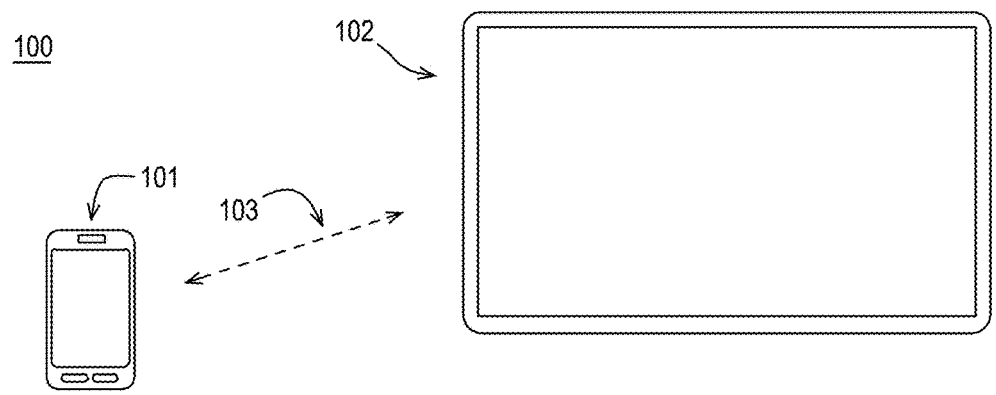
FIG. 1 is an illustrative diagram of an example system for remotely displaying video content.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to content based encoding of graphics based video content for transmission and display via a remote device and, in particular, to coding such video content based on graphics properties corresponding to the video content.

As described above, current encode techniques performed at the transmit side in a wireless display setting (e.g., AVC, HEVC, or the like) may be designed for naturally captured video and may not be efficient for encoding computer generated content such as desktop content, gaming content, or the like. In some embodiments discussed herein, encoding graphics based video content for transmission and display via a remote device may include collecting, from a graphics composition system, graphics properties associated with one or more graphics layers of a frame of a video sequence. As used herein, the term graphics based video content may include any video content generated via a computing device such as a graphics composition system of a computing device. For example, a graphics composition system may generate frames of a video sequence by rendering one or more graphics layers of the frame. Such a frame may be stored (e.g., in a frame buffer), retrieved, encoded, packetized and transmitted to a remote display device, which may decode and display the frame. For example, the discussed graphics properties associated with the one or more graphics layers of the frame of the video sequence may be collected from the graphics composition system and may include geometries (e.g., sizes and shapes) of graphics layers, layer types (e.g., text, texture, picture, etc.) of graphics layers, indicators indicating whether the graphics layers have been updated in the current frame, transform matrices corresponding to the graphics layers, or the like.

Based on the collected graphics properties, one or more encode settings for the frame of the video sequence may be determined. For example, if the graphics properties indicate a size and shape of a graphics layer and that the graphics layer is updated in the current frame, the encode settings may include a coding mode setting for the graphics layer (e.g., for coding blocks of the graphics layer) indicating the graphics layer is to be encoded in intra mode. Furthermore, if another graphics layer of the current frame has not been updated, the encode settings may include a coding mode setting for that graphics layer (e.g., for coding blocks) indicating it is to be encoded using skip mode (e.g., such that no residuals are generated) using a motion vector of zero. Also, if the graphics layer (e.g., the layer being coded intra) is indicated as being text via the collected graphics properties, the encode settings may include a high quality encode mode setting for the graphics layer such that the text is encoded using a minimum available quantization parameter, the encode controller selects a lower quantization parameter for the layer, or the like.

In another example, the graphics properties may indicate a graphics layer fills a particular frame. In such an example, the encode settings may include an indicator to set the frame to an intra frame. For example, the encode settings may include a frame type setting of intra frame for the frame, a scene change frame setting for the frame, or the like. In yet another example, the graphics properties may include a transform matrix for a graphics layer of a frame or frames. Such a transform matrix may be used to transform the graphics layer during an animation process (e.g., swiping a view of an application into or out of the frame, rotating a view of an application, or the like). In such an example, the encode settings may include a motion estimation setting of skip motion estimation or the like for the graphics layer such that motion estimation is skipped for the graphics layer and encoding of the frame may perform motion compensation using motion vectors based on the transform matrix (e.g., directly if the transform matrix includes motion vectors or by determining motion vectors from the transform matrix).

The frame of the video sequence may be coded for wireless transmission based on the one or more encode settings to generate an encoded frame, which may be packetized and transmitted to a remote device for decode and display. Such techniques may provide content intelligent video encoding for wireless display technologies. For example, for a frame buffer having frames generated for viewing a desktop or other graphics based or computer generated content, the rendering of such frames by the application and/or graphics composition system may provide graphics properties or properties of the content that are available via the graphics composition system (e.g., via the software stack and/or operating system). As is discussed herein, such properties may be used to generate or determine encode settings that may be used during the coding of such frames. The determination of such encode settings based on the properties attained from the graphics composition system may provide better power, performance, and video quality. As discussed further herein, the properties may include the dirty area of a frame (e.g., the portion of the frame or picture that is current being altered), text areas of a frame (e.g., which may benefit from compression with higher picture quality), motion vectors of moving objects (e.g., from a transform matrix of the object), an indicator the frame the start of a new scene, or the like.

FIG. 1 is an illustrative diagram of an example system 100 for remotely displaying video content, arranged in accordance with at least some implementations of the present disclosure. As shown in FIG. 1, system 100 may include a source device 101 (e.g., transmit device) and a target device 102 (e.g., receive device or sink) communicatively coupled via a communications channel 103. In some examples, source device 101 may transmit, via communications channel 103, encoded image or video data to target device 102. Target device 102 may receive the encoded image or video data, decode it to generate images or video frames or the like, and present the decoded image content to a user via a display of target device 102. Although illustrated with a single source device 101 and a single target device 102 communicating via a single communications channel 103, any number or transmitting devices, receiving devices, and/or wireless communications channels may be employed in system 100.

Furthermore, a user may interact with source device 101, target device 102, or user input device(s) coupled to source device 101 and/or target device 102. For example, a user may interact with a touch screen or buttons or the like of source device 101, a touch screen or buttons or the like target device 102, an input device (e.g., a mouse, a keyboard, a gesture capture device, a camera, or the like) coupled to source device 101 and/or target device 102, or the like. Such user interactions may be captured as user input(s) via source device 101 or via target device 102 and such user input(s) may transmitted to source device 101. For example, such user input may be used by applications or the like of source device 101. Such applications or the like may utilize user input(s) in a wide variety of ways and, in some example, such user input(s) as implemented via applications or the like may modify rendered frames that are to be locally displayed via source device 101 and/or remotely displayed via target device 102.

In the illustrated example, source device 101 is a smartphone and target device 102 is a mounted display device. However, any combination of suitable devices may be implemented via system 100. For example, source device 101 may include any suitable device such as a computer, a laptop, an ultrabook, a smartphones, a tablet, or the like. Furthermore, target device 102 may include any suitable device such as a touch display, display glass, a television, a smart television, a mounted display device, a computer, a laptop, an ultrabook, a smartphone, a tablet, or the like. In some examples, target device 102 may be a set-top box or a digital recorder or the like. In such examples, target device 102 may not include a display, but target device 102 may be coupled to a display for presentment of video content. In any case, source device 101 and/or target device 102 may be described as computing devices herein. Furthermore, the video content transmitted from source device 101 to target device 102 may include any suitable video content such as graphics based video content as discussed herein. In some examples, only target device 102 may present image content to users (e.g., a display of source device 101 may be off). In other examples, target device 102 and source device 101 may present the same content to a user or users and, in further examples, they may present different content. In an embodiment, system 100 may provide a clone mode or mirror mode or the like such that source device 101 and target device 102 display the same content.

In the illustrated example, communications channel 103 is a wireless communications channel. However, communications channel 103 may be any suitable wired or wireless communications channel or link that may be facilitated via any suitable protocol(s) or standard(s). In some examples, communications channel 103 is a Wi-Fi connection based on an Institute of Electrical and Electronics Engineers (IEEE) 802.11 standard such as 802.11a/b/g/n/ac/ad or the like. In some examples, communications channel 103 may provide communications based on wireless display (WiDi) technology and/or based on implementation of a wireless screen casting standard such as a Miracast standard using WiFi direction connections.

As discussed herein, during encode of video content for transmission via communications channel 103, source device 101 may use graphics properties associated with or corresponding to graphics layers of a frame or frames of a video sequence to determine encode settings, which may be used to efficiently code the video sequence. Source device 101 may packetize and transmit the resultant encoded frame(s) over communications channel 103 to target device 102, which may decode the encoded frame(s) and present the decoded video sequence to a user or users.

Figure 2:
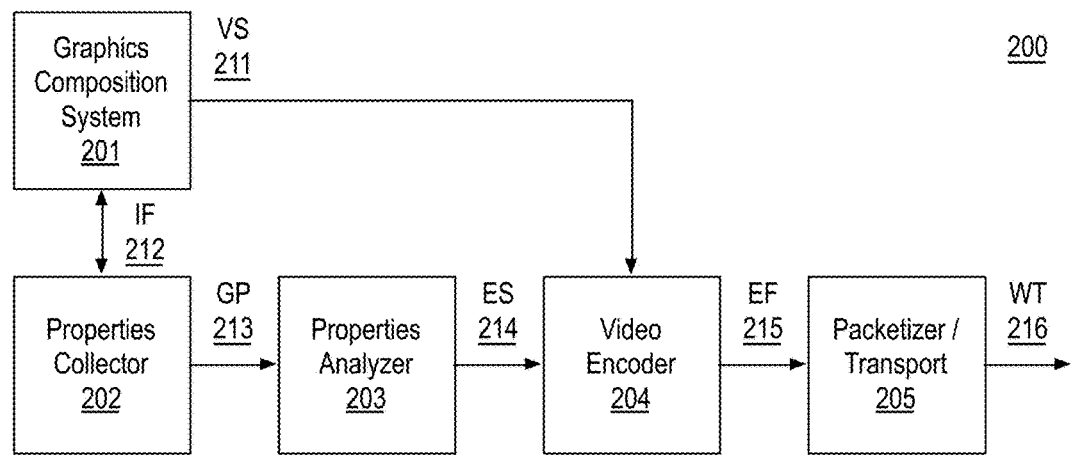
FIG. 2 illustrates an example system for encoding video content for wireless transmission.

FIG. 2 illustrates an example system 200 for encoding video content for wireless transmission, arranged in accordance with at least some implementations of the present disclosure. In some examples, system 200 may be implemented as a portion of source device 101. As shown in FIG. 2, system 200 may include a graphics composition system 201, a properties collector 202, a properties analyzer 203, a video encoder 204, and a packetizer and transport module 205. As shown, graphics composition system 201 of system 200 may generate a video sequence (VS) 211.

Graphics composition system 201 may include any suitable combination of hardware and software to generate frames of a video sequence and may generate video sequence 211 using any suitable technique or techniques. In an embodiment, an application or applications may generate a graphics layer, layers, or the like and graphics composition system 201 may render and/or combine such layers to generate a frame or frames of video sequence 211. In an embodiment, graphics composition system 201 may be implemented at least partially via an operating system of system 200.

Figure 3:
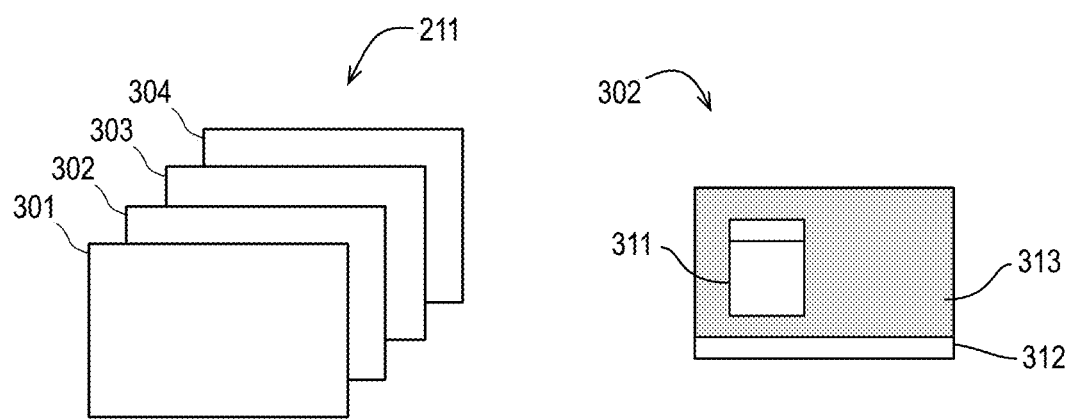
FIG. 3 illustrates an example video sequence and an example frame.

FIG. 3 illustrates example video sequence 211 and an example frame 302, arranged in accordance with at least some implementations of the present disclosure. As shown, video sequence 211 may include multiple frames 301, 302, 303, 304 over time. Video sequence 211 may include any suitable frames 301-304 of any suitable format. Frames 301-304 may be characterized as pictures in some contexts and, as discussed further herein, frames 301-304 may be provided to an encoder, which may partition each of frames 301-304 into blocks (e.g., prediction blocks, transform blocks, and so on) and encode frames 301-304 using inter- and intra-prediction techniques, transform techniques, and quantization techniques based on such blocks. As discussed, graphics composition system 201 may generate video sequence 211 such that video sequence 211 includes graphics layers, graphics content, or computer generated content. For example, frames 301-304 may include one or more layers such as graphics layers or the like.

As shown, any frame of video such 211 such as frame 302 may include one or more graphics layers such as graphics layers 311, 312, 313. In the illustrated example, frame 302 may include three graphics layers, however, frame 302 may include any number of graphics layers such as one, two, three, or more graphics layers having any suitable content. For example, frame 302 may include graphics layer 311 representative of a window of an application, graphics layer 312 representative of a tool or title bar, graphics layer 313 representative of a background or desktop, or the like. For example, graphics layer 311 may include application content including gaming content, video content, image content, or the like. As will be appreciated, it may be desirable to display such content on a larger display as may be provided via target device 102 (please refer to FIG. 1).

Returning to FIG. 2, as shown, video sequence 211 may be provided to video encoder 204 for coding as is discussed further below. Furthermore, as shown in FIG. 2, an interface OF) 212 may be provided between graphics composition system 201 and properties collector 202. Interface 212 may include any suitable interface such that properties collector 202 may collect or determine properties such as graphic properties corresponding to video sequence 211. For example, interface 212 may provide for properties collector 202 to request such graphic properties from graphics composition system 201. As discussed, in some embodiments, graphics composition system 201 may be implemented at least partially via an operating system of system 200 such that properties collector 202 may interface with the software stack implemented via the operating system to provide interface 212. Properties collector 202 may be implemented via hardware, firmware, software, or a combination thereof. In an embodiment, properties collector 202 is implemented via software. Furthermore, properties collector 202 may be adaptable to the implementation of graphics composition system 201 (e.g., adaptable to different operating systems or the like).

As shown, properties collector 202 may attain and provide to properties analyzer 203 one or more properties such as graphics properties (GP) 213. Graphics properties 213 may include any suitable properties corresponding to video sequence 211. For example, graphics properties 213 may correspond to video sequence 211, to a frame or frames of video sequence 211, and/or to graphics layer(s) of a frame or frames of video sequence 211. For example, graphics properties 213 may be implemented at a sequence level, a frame level, and/or a layer level with respect to video sequence 211. Graphics properties 213 may include any suitable property or properties such as geometries (e.g., sizes and shapes) of graphics layers, layer types (e.g., text, texture, picture, etc.) of graphics layers, indicators indicating whether the graphics layers have been updated in the current frame, transform matrices corresponding to the graphics layers, or the like. Examples of such graphics properties 213 are discussed further herein.

Properties collector 202 may provide graphics properties 213 properties analyzer 203, which may receive graphics properties 213 and generate encode settings 214 based on graphics properties 213. Properties analyzer 203 may be implemented via hardware, firmware, software, or a combination thereof. Properties analyzer 203 may generate encode settings 214 using any suitable technique or techniques. For example, properties analyzer 203 may generate encode settings 214 such that subsequent encoding of video sequence 211 may provide for reduced computational complexity, increased video quality, and the like. Encode settings 214 may include any suitable data structure and may include any suitable settings such as a coding mode setting of skip mode for coding blocks of a graphics layer, a coding mode setting of intra mode for coding blocks of a graphics layer, a high quality encode mode setting for a graphics layer (e.g., setting a minimum or reduced quantization parameter for blocks of a graphics layer), a frame type setting of intra frame or scene change frame for a frame, a motion estimation setting of skip motion estimation for a graphics layer or frame, or the like. Such encode settings 214 examples are discussed further herein and, in particular, with respect to FIGS. 4-6.

With continued reference to FIG. 2, video encoder 204 may receive video sequence 211 and encode settings 214 and video encoder 204 may generate an encoded frames (EF) 215. Video encoder 204 may be any suitable video encoder that may implement a coding according to a standard or the like to such that encoded frames 215 are standards compliant or the like. For example, video encoder 204 may implement Advanced Video Coding (AVC; H.264/MPEG-4 AVC), High Efficiency Video Coding (HEVC), VP9 coding, VP10 coding, Alliance for Open Media (AOM) coding, or the like. Video encoder 204 may be implemented via hardware, firmware, software, or a combination thereof.

As discussed, video encoder 204 may implement encode settings 214 during the encode of video sequence 211. Details of example encode settings and their modification of the coding provided by video encoder 204 are discussed further herein below. As shown, packetizer and transport module 205 may receive encoded frames 215 and packetizer and transport module 205 may packetize encoded frames and generate a wireless transmission 216 including the resultant packets that may be transmitted to a remote device. For example, a packetizer of packetizer and transport module 205 may receive and packetize encoded frames 215 to generate data packets. Such data packets may be transmitted (either directly or via memory) via a transport module of packetizer and transport module 205 to generate wireless transmission 216. The transport module may receive and transmit the data packets to generate a wireless transmission, which may be carried via a communications channel (such as communications channel 103, please refer to FIG. 1) to a remote device, which may de-packetize, decode, and present video data to a user via a display of the remote device.

Figure 4:
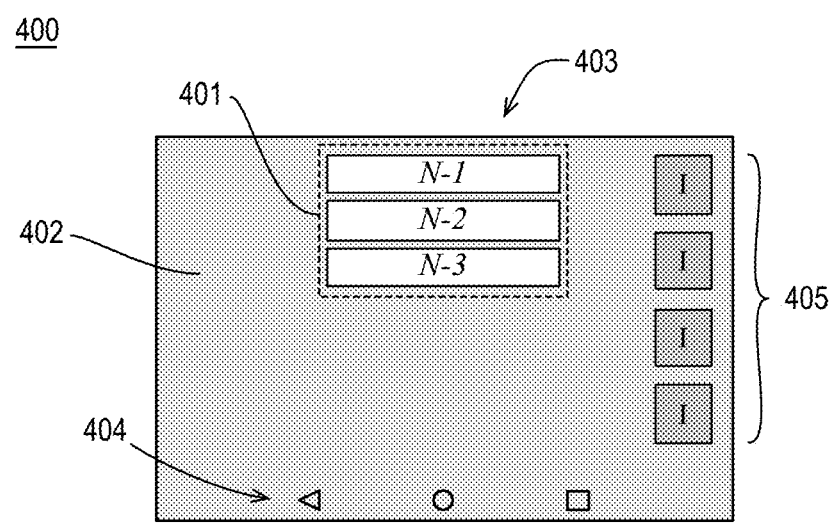
FIG. 4 illustrates an example video frame for coding.

FIG. 4 illustrates an example video frame 400 for coding, arranged in accordance with at least some implementations of the present disclosure. For example, video frame 400 may be a part of a video sequence such as video sequence 211 or the like. As discussed with respect to FIG. 1, graphics properties 213 may be determined corresponding to video frame 400. As shown, video frame 400 may include a background layer 402 including navigation features 404 and icons 405 and a notification layer 401 including one or more notifications 403 (e.g., labeled N-1, N-2, N-3). In the illustrated example, video frame 400) includes two graphics layers: background layer 402 and notification layer 401. However, as discussed, video frame 400 may include any number of graphics layers. Furthermore, background layer 402 may include any additional features and/or one or both of navigation features 404 and icons 405 may not be present. Notification layer 401 is shown having three notifications 403, however, any number of notifications may be used. Also, notification layer 401 is shown as slightly larger than the areas of notifications of 403 for the sake of clarity of presentation, notification layer 401 may be the same size as notifications 403 for example.

Furthermore, video frame 400 is exemplary and is provided for clarity of presentation. Without loss of generality, video frame 400 may include a graphics layer (e.g., background layer 402) that has not changed with respect to a previous frame and a graphics layer (e.g., notification layer 401) that has changed with respect to the previous frame. In such contexts, graphics properties 213 may include a size and shape (e.g., a geometry) of notification layer 401 and an indicator (e.g., an update indicator or the like) that notification layer 401 has changed or newly appeared with respect to the previous frame. For example, notification layer 401 may be newly presented in video frame 400 with respect to a previous frame. Furthermore, if notification layer 401 includes content of a certain type, graphics properties 213 may include an indicator of the type of content. For example, graphics properties 213 may include an indicator that notification layer 401 includes text. Also, graphics properties 213 may include an indicator that background layer 402 has not changed with respect to the previous frame. In an embodiment, graphics properties 213 may further include a size and shape of background layer 402.

For example, FIG. 4 may present a notification operation or menu operation or the like such that notification layer 401 may be newly presented when an application or menu item or the like has information for a user. Without loss of generality, such a graphics layer (e.g., notification layer 401) that has changed with respect to a previous frame may be characterized as an updated region or area, dirty area, or the like of video frame 400. In such a context, only notification layer 401 may be updated or changed while another layer (e.g., background layer 402) has not changed.

Using the described graphics properties 213, properties analyzer 203 may generate encode settings 214 for video frame 400 such that encode settings 214 include a coding mode setting of skip mode and/or a motion vector setting of zero motion vector for background layer 402. For example, for coding blocks of a graphics layer that has not changed with respect to a previous frame, a skip mode and zero motion vector may be indicated. In response to a coding mode setting of skip mode for coding blocks of the graphics layer (e.g., background layer 402), video encoder 204 may set blocks of the graphics layer to skip mode with a zero motion vector. Such a coding mode or similar coding mode may provide for no residual blocks to be generated and may provide for motion compensation with a zero motion vector. Such an encode setting from properties analyzer 203 may eliminate the need for video encoder 204 to determine a mode for such blocks, determine a residual for such blocks, and/or perform motion estimation for such blocks, which may save processing time and complexity. Furthermore, since the skip mode setting may be provided based on properties analyzer 203 having indication that such blocks (e.g., within the graphics layer) have not changed in the current frame, such a skip mode does not reduce video quality.

Furthermore, properties analyzer 203 may generate encode settings 214 for video frame 400 such that encode settings 214 include a coding mode setting of intra mode for notification layer 401. For example, for coding blocks of a graphics layer that has been changed or updated with respect to a previous frame, an intra mode may be indicated. In response to a coding mode setting of intra mode for coding blocks of the graphics layer (e.g., notification layer 401), video encoder 204 may set blocks of the graphics layer to intra mode and may determine a mode among many available intra modes (e.g., directional modes, DC mode, planar modes, etc.) for coding the blocks. Such an encode setting from properties analyzer 203 may again save processing time and complexity for video encoder 204 and may provide high quality video for notification layer 401.

Further still, based on the indicator that notification layer 401 includes text, properties analyzer 203 may generate encode settings 214 for video frame 400 such that encode settings 214 include high quality encode mode setting for notification layer 401. For example, for coding blocks of a graphics layer that has text or text elements, a high quality encode mode setting may be provided. In response to such a high quality encode mode setting, video encoder 204 may provide a minimum quantization parameter for the graphics layer, reduce a quantization parameter for the graphics layer, apply more bits and allow less distortion for the graphics layer (e.g., via rate distortion optimization processing), adjust prediction partitioning and/or transform partitioning, or the like. Such an encode setting from properties analyzer 203 may again save processing time and complexity for video encoder 204 and may provide high quality video for notification layer 401.

Figure 5:
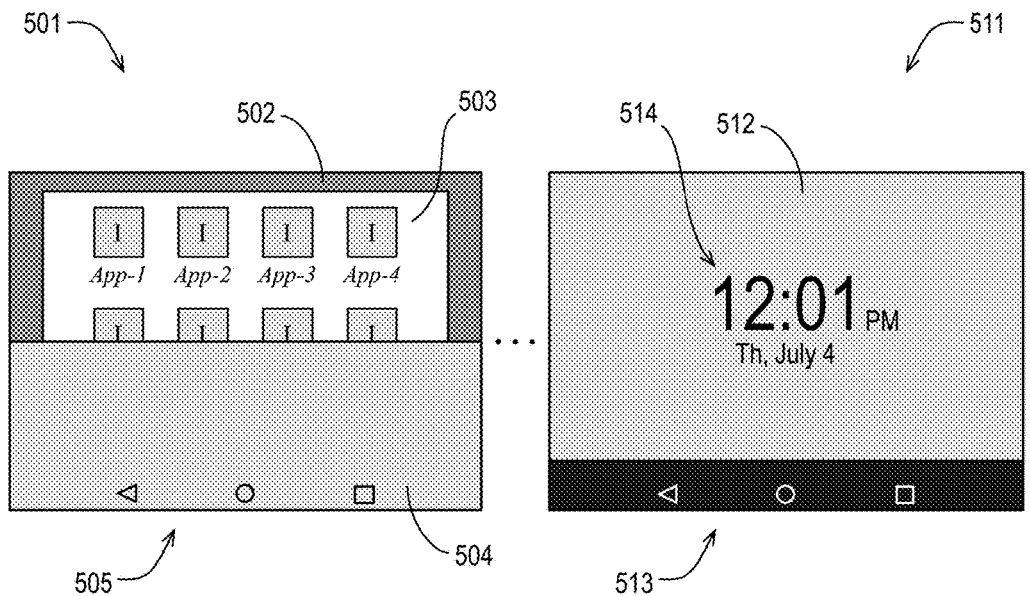
FIG. 5 illustrates example video frames for coding.

FIG. 5 illustrates example video frames 501, 511 for coding, arranged in accordance with at least some implementations of the present disclosure. For example, video frames 501, 511 may be a part of a video sequence such as video sequence 211 or the like. As discussed with respect to FIG. 1, graphics properties 213 may be determined corresponding to video frames 501, 511 and any other corresponding frames (not shown). For example, video frame 511 may temporally follow video frame 501 either immediately or with an intervening frame or frames. As shown, video frame 501 may include a background layer 502, a transition layer 504 including navigation features 505, and a window layer 503 presenting application icons (e.g., labeled App-1, App-2, App-3, App-4). Also as shown, video frame 511 may include a single presentation layer 512 including navigation features 513 and a time/date display 514. In the illustrated example, video frame 501 includes three graphics layers and video frame 511 includes one graphics layer. However, video frames 501, 511 may include any number of graphics layers. Furthermore, the illustrated layers may include any additional features and/or the removal of particular features.

Video frames 501, 511 are exemplary and are provided for clarity of presentation. Without loss of generality, video frames 501, 511 may include a graphics layer (e.g., transition layer 504) providing a transition to a new application or the like and a graphics layer (e.g., single presentation layer 512) that fills the video frame with a new application or the like. In such contexts, the new application may be any suitable application and/or content such as home screen content, application content, gaming content, video content, image content, or the like. Furthermore, the illustrative example includes transition layer 504, however, any suitable transition to single presentation layer 512 may be provided such as any animation, an abrupt change (e.g., changing to video frame 511 without any transitional graphics), or the like.

For example, FIG. 5 may present an application launch such that an animation process is invoked to gradually switch to the application, which is presented via presentation layer 512. For example, transition layer 504 may be animated in over several frames until presentation of video frame 511. Using the described graphics properties 213, properties analyzer 203 may generate encode settings 214 for video frames 501, 511 and any other frames of the sequence that include geometries of background layer 502, transition layer 504, window layer 503, and single presentation layer 512 and/or the types and/or contents of such layers. Based on such graphics properties 213, properties analyzer 203, indicate video frame 511 is a scene change frame. For example, based on graphics properties 213 corresponding to single presentation layer 512 indicating single presentation layer 512 has a geometry (e.g., size and shape) that will fill video frame 511, properties analyzer 203 may determine single presentation layer 512. Based on such a determination, properties analyzer 203 may generate encode settings 214 for video frame 511 such that encode settings 214 include a frame type setting of intra frame, scene change frame, golden frame, or the like for video frame 511. For example, for coding video frame 511, a frame selection type of intra frame, scene change frame, golden frame, or the like may be provided.

In response to such a frame selection type setting or indicator, video encoder 204 may set a frame type of video frame 511 to intra frame, scene change frame, golden frame, or the like. Such an encode setting from properties analyzer 203 may save processing time and complexity for video encoder 204 and may provide for a higher quality coded frame for video frame 511 or any other frame that has a graphics layer that fills the frame. Such techniques may provide a quick and efficient determination of the need for an intra frame, scene change frame, golden frame, or the like, which may, in turn, provide a high quality reference for future frames.

Figure 6:
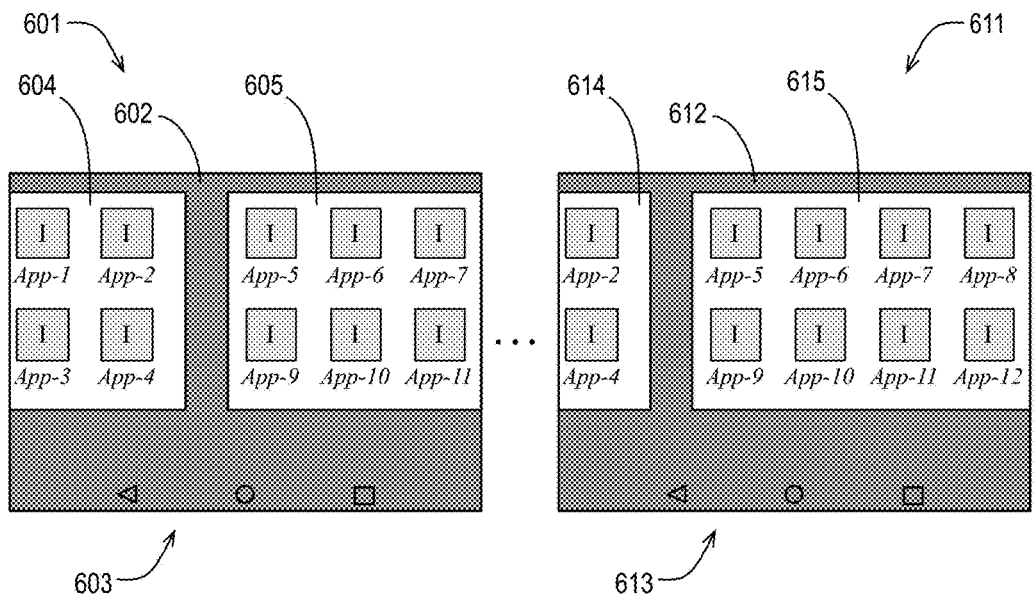
FIG. 6 illustrates example video frames for coding.

FIG. 6 illustrates example video frames 601, 611 for coding, arranged in accordance with at least some implementations of the present disclosure. For example, video frames 601, 611 may be a part of a video sequence such as video sequence 211 or the like. As discussed with respect to FIG. 1, graphics properties 213 may be determined corresponding to video frames 601, 611 and any other corresponding frames (not shown). For example, video frame 611 may temporally follow video frame 601 either immediately or with an intervening frame or frames. As shown, video frame 601 may include a background layer 602 including navigation features 603, a window layer 604 presenting application icons (e.g., labeled App-1, App-2, App-3, App-4), and a window layer 605 presenting application icons (e.g., labeled App-5 through App-12 such that App-8 and App-12 are not yet visible in video frame 601). Also as shown, video frame 611 may include a background layer 612 including navigation features 613, a window layer 614 presenting application icons (e.g., with App-2 and App-4 still visible), and a window layer 605 presenting application icons (e.g., App-5 through App-12). In the illustrated example, video frames 601, 611 each include three graphics layers. However, video frames 601, 611 may include any number of graphics layers. Furthermore, the illustrated layers may include any additional features and/or the removal of particular features. As shown, video frames 601, 611 may include window layers that are being animated or the like (e.g., window layer 604 transitioning to window layer 614 and window layer 605 transitioning to window layer 615). Such animation or motion or the like may be performed via a transform matrix, transform mapping, or the like that may provide a transform from window layer 604 to window layer 614 and from window layer 605 to window layer 615 or the like.

Video frames 601, 611 are exemplary and are provided for clarity of presentation. Without loss of generality, video frames 601, 611 may include any number of graphics layers that are being moved on a frame by frame basis via a transform matrix or the like. The transform matrix may include any suitable data structure that provides for frame by frame motion such as motion vectors or the like. In such contexts, the graphics layer being moved may include any suitable application and/or content such as application content, gaming content, video content, image content, or the like. Furthermore, the illustrative example provides window layer 604 and window layer 605 as separate graphics layers. In other embodiments such layers may be the same graphics layer.

For example, FIG. 6 may present an example where motion information for an object or graphics layer or the like may be attained. Such motion information may be associated with a switching between desktops (e.g. the old desktop associated with window layers 604, 614 is moving out to the left and the new desktop associated with window layers 605, 615 is moving in from the right), from a first desktop page to a second desktop page, or the like. Such motions or animations may be provided to enhance user immersion and experience for example. However, as discussed, the motion information, transform matrix, or the like may correspond to any graphics layer undergoing any sort of motion such as swiping, minimization, enlarging to full size, rotation (e.g. from landscape to portrait or vice versa), or the like.

In such contexts, graphics properties 213 may include a transform matrix, transform mapping, motion vector, group of motion vectors, or any suitable data structure for animating of moving a graphics layer. Furthermore, graphics properties 213 may include an indicator of animation or motion or the like. Using such graphics properties 213, properties analyzer 203 may generate encode settings 214 for video frames 601, 611 and any other frames of the video sequence such that encode settings 214 include a motion estimation setting of skip motion estimation for the graphics layer (e.g., the graphics layer of window layers 604, 614 and/or window layers 605, 615).

In response to such a skip motion estimation setting of skip motion estimation, video encoder 204 may skip motion estimation for blocks of the graphics layer (e.g., the process of finding a matching block for each block may be skipped). Furthermore, motion compensation for such blocks may be performed using motion vectors based on the received graphics properties 213 (e.g., motion vectors from or attained from the transform matrix, transform mapping, motion vector, group of motion vectors, or the like). For example, with reference to FIG. 6, motion vectors or a motion vector for window layers 604, 614 and windows layers 605, 615 may be received based on a transform matrix or the like. In the example of FIG. 6, such motion may be horizontal. In such an embodiment, video encoder 204 may receive motion vector(s) directly from properties analyzer 203 via graphics properties 213 and video encoder 204 may skip motion estimation and use such motion vector(s) directly for motion compensation or the like. Such techniques may provide higher quality compression (e.g., as exact motion vector(s) may be determined) and computational efficiency and power savings may be provided as motion estimation may be complicated and power intensive.

Figure 7:
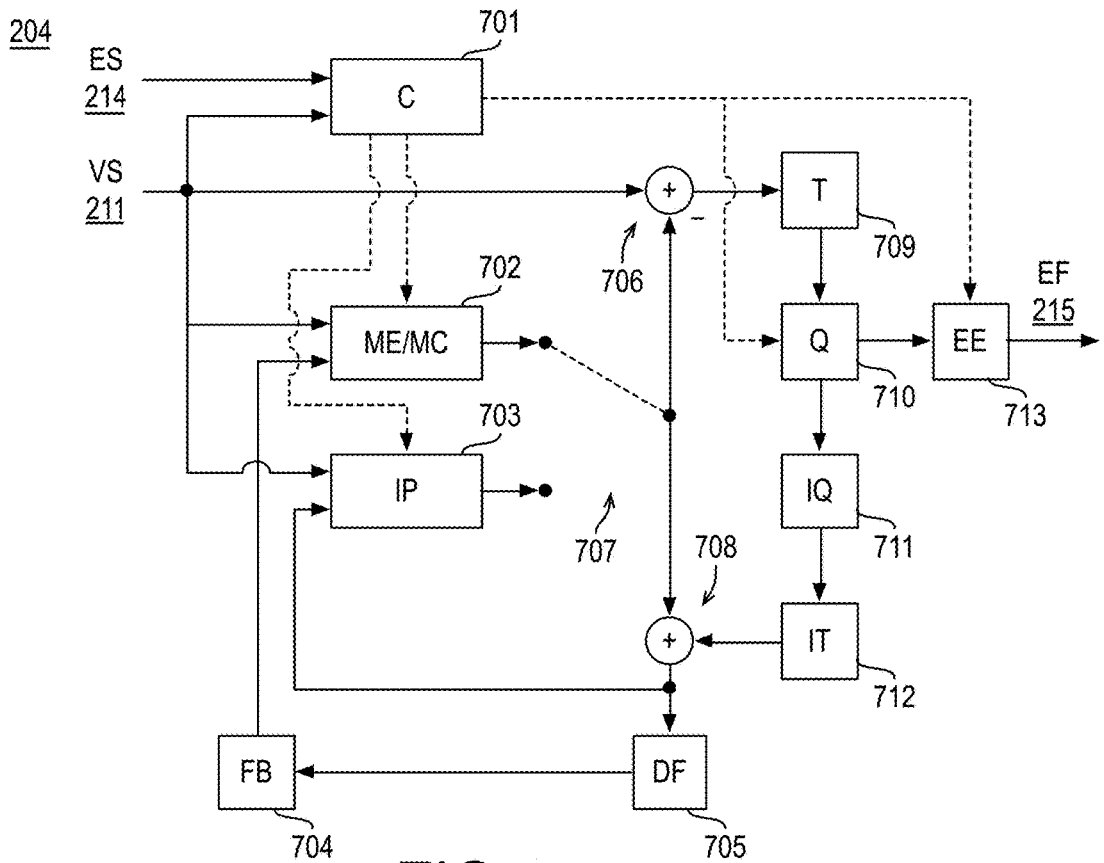
FIG. 7 illustrates a block diagram of an example video encoder.

FIG. 7 illustrates a block diagram of example video encoder 204, arranged in accordance with at least some implementations of the present disclosure. As shown, video encoder 204 may include a controller 701, a motion estimation and motion compensation (MF/MC) module 702, an intra prediction (IP) module 703, a frame buffer (FB) 704, a deblock filtering (DF) module 705, a differencer 706, a selection switch 707, an adder 708, a transform (T) module 709, a quantization (Q) module 710, an inverse quantization (IQ) module 711, an inverse transform (IT) module 712, and an entropy encoder (EE) module 713. Video encoder 204 may include additional modules and/or interconnections that are not shown for the sake of clarity of presentation.

As shown, video encoder 204 may video sequence 211 and encode settings 214 and video encoder 204 may generate encoded frames 215. Video sequence 211 may include any suitable input video data such as input video frames or the like in any suitable format as discussed herein. Furthermore, encoded frames 215 may include any suitable encoded frames such as standards compliant encoded frames 215 or the like.

For example, video encoder 204 may divide a frame of video sequence 211 into blocks (e.g., macroblocks, coding units, prediction blocks, transform blocks, or the like) of different sizes, which may be predicted either temporally (inter) via motion estimation and motion compensation module 702 or spatially (intra) via intra prediction module 703. Such a coding decision may be implemented via selection switch 707. Furthermore, after the decision is made as to whether a block is going to be intra or inter coded, a difference with source pixels may be made via differencer 706. The difference may converted to the frequency domain (e.g., based on a discrete cosine transform or the like) via transform module 709 and converted to coefficients via quantization module 710. Such quantized coefficients along with various control signals may be entropy encoded via entropy encoder module 713 to generate encoded frames 215, which may be packetized and transmitted to a target device as discussed herein. Furthermore, the quantized coefficients may be inverse quantized via inverse quantization module 711 and inverse transformed via inverse transform module 712 to generate reconstructed differences or residuals. The reconstructed differences or residuals may be combined with reference blocks via adder 708 to generate reconstructed blocks, which, as shown, may be provided to intra prediction module 703 for use in intra prediction. Furthermore, the reconstructed differences or residuals may be deblocked via deblock filtering module 705, reconstructed into reconstructed frames, and stored in frame buffer 704. Such reconstructed frames may be provided to motion estimation and motion compensation module 702 for use in inter prediction.

Furthermore, as shown, encode settings 214 may be received by controller 701, which may use encode settings 214 to modify the coding. For example, coding frames of video sequence 211 for wireless transmission by video encoder 204 may be based, in part, on encode settings 214 to generate encoded frames 215. As shown via hatched lines in FIG. 7, controller 701 may provide control signals to other components or modules of video encoder 204 to control encoding.

In an embodiment, encode settings 214 may include a coding mode setting of skip mode and/or a setting of a motion vector to zero for a graphics layer (e.g., for blocks of a graphics layer). Such encode settings 214 may be provided when properties analyzer 203 determines a portion or layer of a frame has not changed with respect to a previous frame, for example (e.g., as discussed with respect to FIG. 4). In such an embodiment, for blocks of the graphics layer having the skip mode setting and/or the zero motion vector setting, controller 701 may provide a control signal to motion estimation and motion compensation module 702 and/or intra prediction module 703 that such blocks may be skipped and their motion vectors may be set to zero.

In another embodiment, encode settings 214 may include a coding mode setting of intra mode for a graphics layer (e.g., for blocks of a graphics layer). Such encode settings 214 may be provided when properties analyzer 203 determines a portion or layer of a frame has changed with respect to a previous frame, for example (e.g., as discussed with respect to FIG. 4). In such an embodiment, for blocks of the graphics layer having the intra mode setting, controller 701 may provide a control signal to intra prediction module 703 that such blocks are to be coded using intra mode. Intra prediction module 703 may determine particular intra modes (e.g., directional, DC, planar, etc.) for such blocks. Furthermore, in some embodiments, encode settings 214 may include a coding mode setting including a high quality encode mode setting for a graphics layer. Such encode settings 214 may be provided when properties analyzer 203 determines a portion or layer of a frame has textual elements or other elements that require high quality video, for example (e.g., as discussed with respect to FIG. 4). In such an embodiment, for blocks of the graphics layer having the high quality encode mode setting, controller 701 may provide a control signal to quantization module 710 indicating use of a minimum quantization parameter, a reduction of quantization parameter, or the like. In addition or in the alternative, controller 701 may apply more bits and allow less distortion for the graphics layer having the high quality encode mode setting (e.g., via rate distortion optimization processing), adjust prediction partitioning and/or transform partitioning of the graphics layer having the high quality encode mode setting, or the like.

In another embodiment, encode settings 214 may include a frame type setting for a frame of video sequence 211. Such encode settings 214 may be provided when properties analyzer 203 determines a frame is a scene change frame, for example (e.g., as discussed with respect to FIG. 5). In such an embodiment, controller 701 may implement coding of the frame of video sequence 211 as an intra frame, scene change frame, golden frame, or the like. For example, controller 701 may provide a control signal to motion estimation and motion compensation module 702 and/or intra prediction module 703 such that the frame is coded only via motion estimation and motion compensation module 702 or spatially (intra) via intra prediction module 703 intra prediction module 703 and without use of motion estimation and motion compensation module 702.

In an embodiment, encode settings 214 may include a transform matrix, transform mapping, motion vector, group of motion vectors, or the like for a graphics layer (e.g., for blocks of a graphics layer) of a frame and/or an indicator that motion estimation is to be skipped for the graphics layer. Such encode settings 214 may be provided when properties analyzer 203 determines a transform matrix or the like for motion or animation of a graphics layer, for example (e.g., as discussed with respect to FIG. 6). In such an embodiment, controller 701 may provide a control signal to motion estimation and motion compensation module 702 that motion estimation is to be skipped for such blocks. Furthermore, controller 701 may provide the motion vector(s) for such blocks for use in motion compensation.

As discussed, video encoder 204 may provide flexibility to utilize and leverage encode settings 214 (e.g., the information provided by properties analyzer 203). For example, video encoder 204 may support dirty region coding (e.g., coding of changed or dirty region of a frame or picture as intra blocks and the rest of the frame or picture as skip blocks), region of interest coding (e.g., coding a region of interest such as a text region or the like with higher video quality), adaptive group of picture capability (e.g., such that a scene change frame or any particular frame may be coded as an intra frame adaptively), and/or external motion vector support (e.g., such that motion estimation may be skipped and external motion vectors may be used).

For example, using the content intelligent video coding techniques discussed herein, available graphics information may be leveraged to guide video encoding to get better video quality, to save power, and to achieve better performance. For example, coding techniques may be selected adaptively on a frame by frame basis according properties associated with the video.

Figure 8:
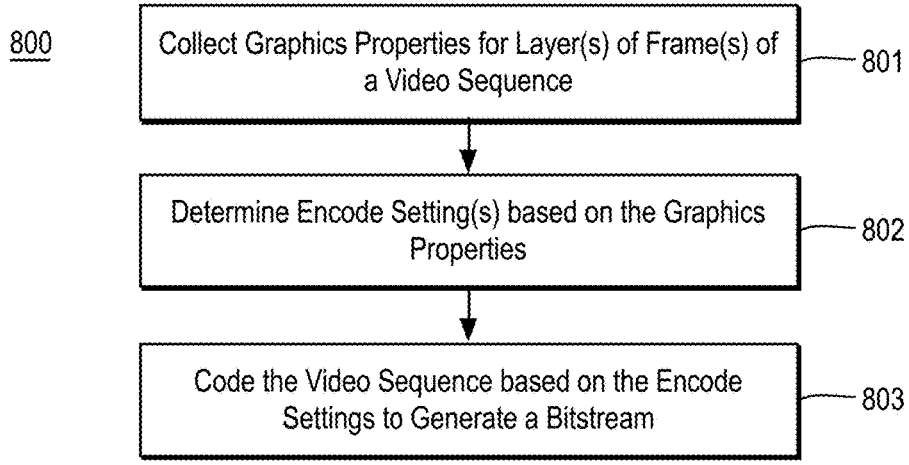
FIG. 8 is a flow diagram illustrating an example process for encoding graphics based video content for transmission and display via a remote device.

FIG. 8 is a flow diagram illustrating an example process 800 for encoding graphics based video content for transmission and display via a remote device, arranged in accordance with at least some implementations of the present disclosure. Process 800 may include one or more operations 801-803 as illustrated in FIG. 8. Process 800 may form at least part of a display pipeline process. By way of non-limiting example, process 800 may form at least part of a display process as undertaken by device 101, system 200, or any other systems discussed herein. Furthermore, process 800 will be described herein with reference to system 900 of FIG. 9.

Figure 9:
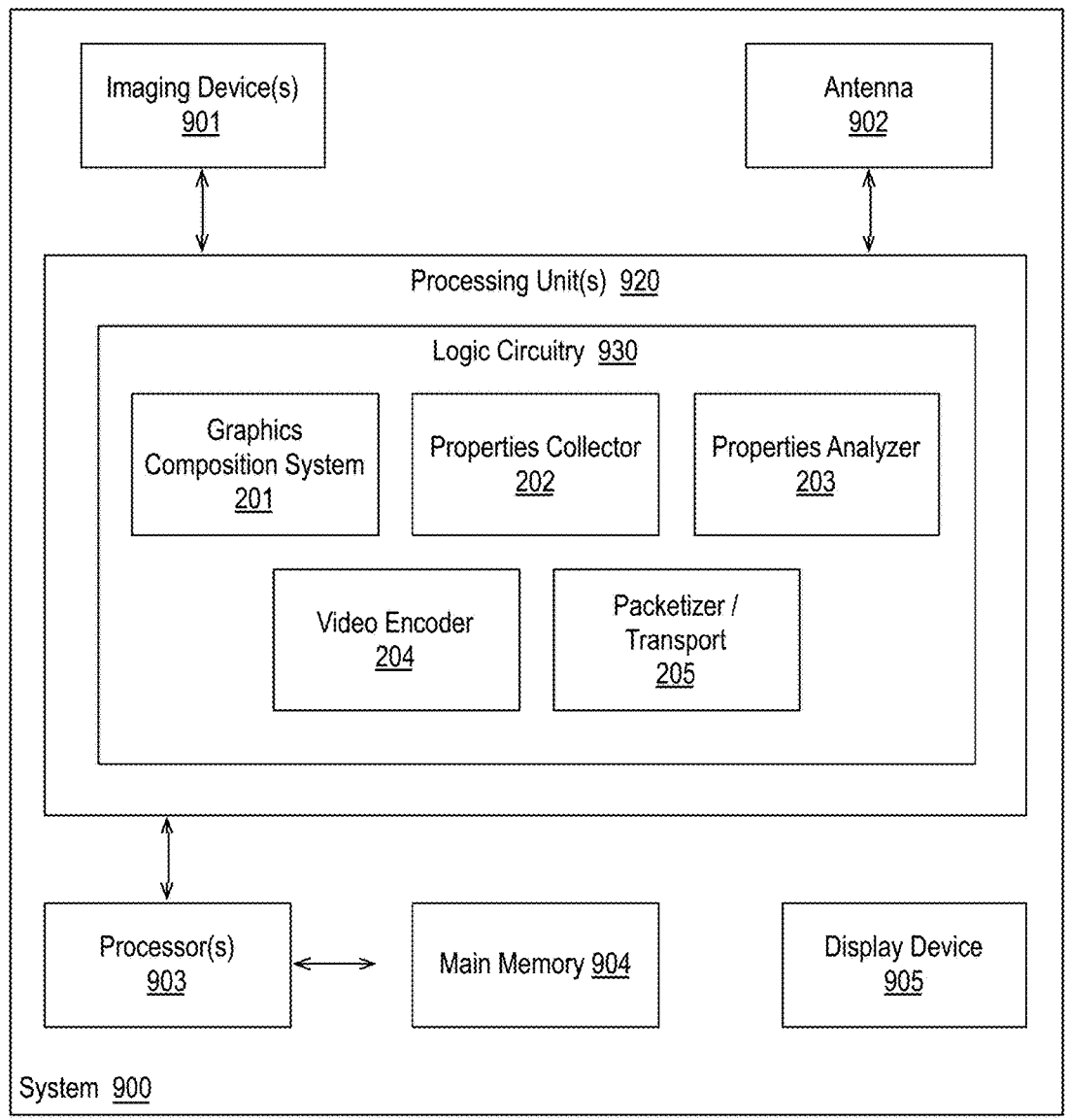
FIG. 9 is an illustrative diagram of an example system for encoding graphics based video content for transmission and display via a remote device.

FIG. 9 is an illustrative diagram of an example system 900 for encoding graphics based video content for transmission and display via a remote device, arranged in accordance with at least some implementations of the present disclosure. For example, system 900 may be a display pipeline system of device 101, a portion thereof, or the like. As shown in FIG. 9, system 900 may include one or more imaging devices 901, an antenna 902, one or more processing unit(s) 920 including logic circuitry 930, one or more processors 903, a main memory 904, and a display device 905. Furthermore, logic circuitry 930 may include or implement graphics composition system 201, properties collector 202, properties analyzer 203, video encoder 204, and packetizer and transport module 205, or portions thereof. As illustrated, imaging device(s) 901, antenna 902, processing unit(s) 920, logic circuitry 930, graphics composition system 201, properties collector 202, properties analyzer 203, video encoder 204, and packetizer and transport module 205, processor(s) 903, main memory 904, and display device 905 may be capable of communication (e.g., coupled) with one another.

As shown, in some examples, system 900) may include antenna 902. Antenna 902 may be configured to transmit or receive a wireless transmission including packetized encoded frame data, for example. Furthermore, in some examples, system 900 may include display device 905. Display device 905 may be configured to present video data such as video sequence 211. As shown, in some example, logic circuitry 930 may be implemented via processing unit(s) 920. Processing unit(s) 920 may include application-specific integrated circuit (ASIC) logic, graphics processor(s), general purpose processor(s), or the like. System 900 also may include optional processor(s) 903, which may similarly include application-specific integrated circuit (ASIC) logic, graphics processor(s), general purpose processor(s), or the like. In some examples, logic circuitry 930 or portions thereof may be implemented via hardware, image processing or coding dedicated hardware, or the like, and processor(s) 903 may implement general purpose software, operating systems, or the like, via, for example, a multi-core central processing unit (CPU). In an embodiment, graphics composition system 201 may be implemented via processor(s) 903. In addition, main memory 904 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, main memory 904 may be implemented by cache memory. In some examples, logic circuitry 930 may access main memory 904 (for implementation of a frame buffer for example). In other examples, logic circuitry 930 and/or processing unit(s) 920 may include memory stores (e.g., a cache or the like) for the implementation of a frame buffer or the like. For example, main memory 904 may store any video data or associated data such as video sequence 211, graphics properties 213, encode settings, 214, encoded frames 215, wireless transmission, or any other data utilized or generated as discussed herein.

As shown, one or more of graphics composition system 201, properties collector 202, properties analyzer 203, video encoder 204, and packetizer and transport module 205 may be implemented via logic circuitry 930. In some examples, one or more of graphics composition system 201, properties collector 202, properties analyzer 203, video encoder 204, and packetizer and transport module 205 may be implemented via a software stack. In some examples, graphics composition system 201, properties collector 202, properties analyzer 203, video encoder 204, and packetizer and transport module 205 may be implemented via the same processing unit(s) 920 and, in other examples, one or more of graphics composition system 201, properties collector 202, properties analyzer 203, video encoder 204, and packetizer and transport module 205 may be implemented via different processing unit(s) 920.

Returning to FIG. 8, process 800 may begin at operation 801, where one or more graphics properties associated with one or more graphics layers of a frame of a video sequence may be collected from a graphics composition system. For example, properties collector 202 as implemented by logic circuitry 930 of processing unit(s) 920 may collect graphics properties associated with one or more graphics layers of a frame of a video sequence from graphics composition system 201 as implemented by logic circuitry 930 of processing unit(s) 920. The graphics properties may include any suitable properties. For example, the graphics properties may include a geometry (e.g., a size and/or shape) of a graphics layer of the graphics layers, a layer type of the graphics layer, an update indicator corresponding to the graphics layer (e.g., indicating whether the graphics layer has been updated in the current frame), a transform matrix corresponding to the graphics layer, or the like.

Processing may continue at operation 802, where one or more encode settings may be determined for the frame of the video sequence based on the one or more graphics properties. For example, properties analyzer 203 as implemented by logic circuitry 930 of processing unit(s) 920 may determine the encode settings. The encode settings may include any suitable encode settings determined using any suitable technique or techniques. In an embodiment, the graphics properties include a size and shape of a first graphics layer (e.g., a notification layer or region) of the graphics layers, an update indicator corresponding to the first graphics layer indicating the first graphics layer is updated in the frame, and a second update indicator corresponding to a second graphics layer (e.g., a background layer or region) of the graphics layers indicating the second graphics layer is not updated in the frame and the encode settings include a coding mode setting of skip mode for all coding blocks of the second graphics layer. Furthermore, the one or more encode settings may further include a second coding mode setting of intra mode for all second coding blocks of the second graphics layer. Further still, the one or more encode settings may further include a high quality encode mode setting for the first graphics layer. For example, the high quality encode mode setting may include an indictor to use a minimum available quantization parameter for the first graphics layer or the like.

In another embodiment, the graphics properties include a size and shape of a graphics layer of the graphics layers indicating the graphics layer fills the frame and the encode settings include a frame type setting of intra frame for the frame.

In yet another embodiment, the graphics properties include a transform matrix for a graphics layer of the graphics layers, the encode settings include a motion estimation setting of skip motion estimation for the graphics layer, and encoding the frame based on the motion estimation setting of skip motion estimation includes performing motion compensation for the frame using motion vectors based on the transform matrix. For example, the graphics layer may include a graphics layer generated by an animation process corresponding to the transform matrix.

Processing may continue at operation 803, where the frame of the video sequence may be coded for wireless transmission based on the one or more encode settings to generate an encoded frame. For example, video encoder 204 as implemented by logic circuitry 930 of processing unit(s) 920 may code the frame of the video sequence for wireless transmission based on the one or more encode settings. Furthermore, the encoded frame may be packetized and wirelessly transmitted. For example, packetizer and transport module 205 as implemented by logic circuitry 930 of processing unit(s) 920, and via antenna 902, may packetize and wirelessly transmit the encoded frame.

The operations of process 800 may be repeated any number of times either in series or in parallel for any number of graphics layers, frames, video sequences, or the like.

Various components of the systems described herein may be implemented in software, firmware, and/or hardware and/or any combination thereof. For example, various components of such devices or systems may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the devices, systems, modules, or components as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 10:
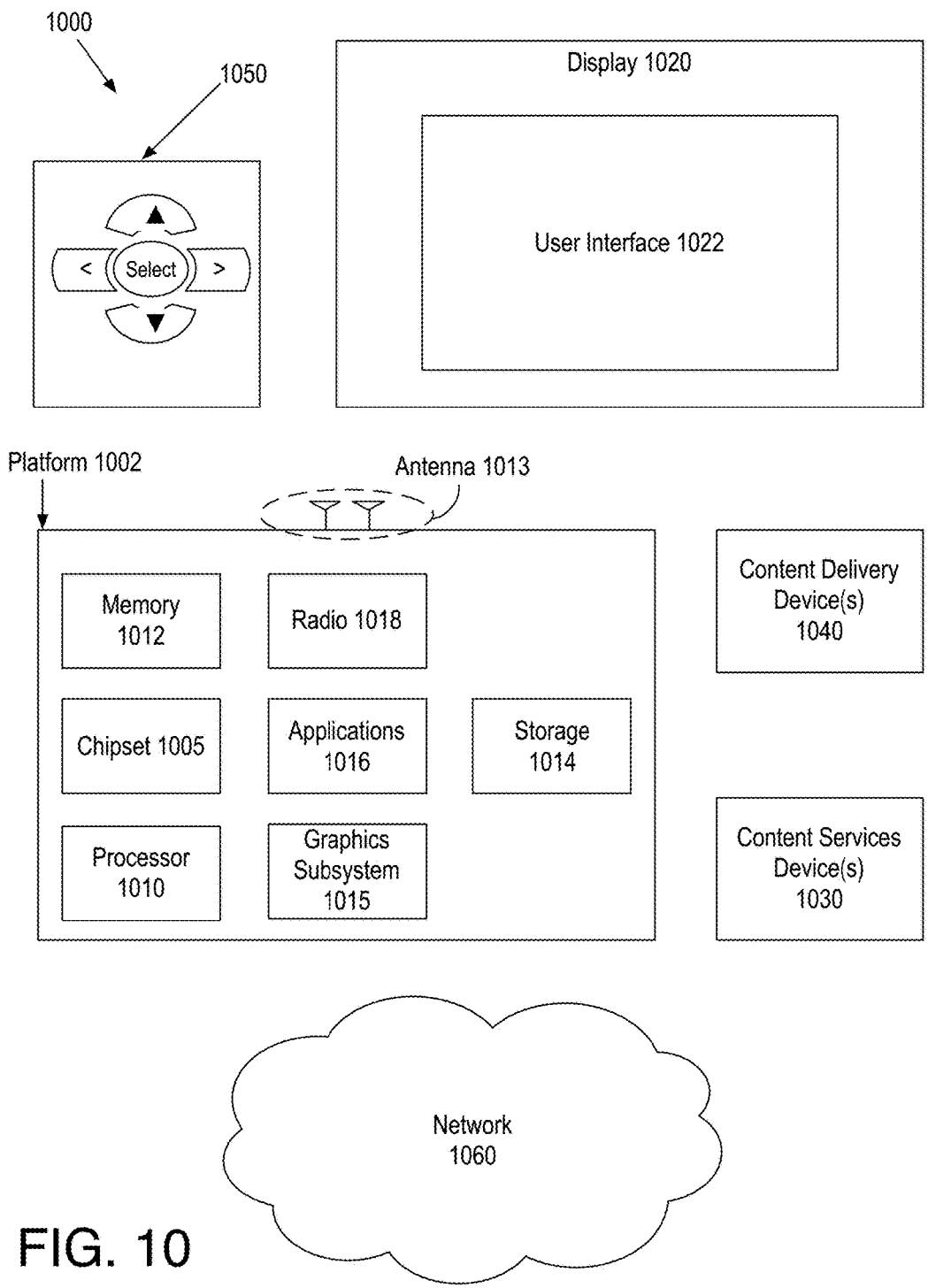
FIG. 10 is an illustrative diagram of an example system.

FIG. 10 is an illustrative diagram of an example system 1000, arranged in accordance with at least some implementations of the present disclosure. In various implementations, system 1000 may be a mobile device although system 1000 is not limited to this context. For example, system 1000 may be incorporated into a personal computer (PC), laptop computer, ultrabook, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1000 includes a platform 1002 coupled to a display 1020. Platform 1002 may receive content from a content device such as content services device(s) 1030 or content delivery device(s) 1040 or other similar content sources. A navigation controller 1050 including one or more navigation features may be used to interact with, for example, platform 1002 and/or display 1020. Each of these components is described in greater detail below.

In various implementations, platform 1002 may include any combination of a chipset 1005, processor 1010, memory 1012, antenna 1013, storage 1014, graphics subsystem 1015, applications 1016 and/or radio 1018. Chipset 1005 may provide intercommunication among processor 1010, memory 1012, storage 1014, graphics subsystem 1015, applications 1016 and/or radio 1018. For example, chipset 1005 may include a storage adapter (not depicted) capable of providing intercommunication with storage 1014.

Processor 1010 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1010 may be dual-core processor(s), dual-core mobile processor(s), and so forth.

Memory 1012 may be implemented as a volatile memory device such as, but not limited to, a Random Access Memory (RAM), Dynamic Random Access Memory (DRAM), or Static RAM (SRAM).

Storage 1014 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1014 may include technology to increase the storage performance enhanced protection for valuable digital media when multiple hard drives are included, for example.

Graphics subsystem 1015 may perform processing of images such as still or video for display. Graphics subsystem 1015 may be a graphics processing unit (GPU) or a visual processing unit (VPU), for example. An analog or digital interface may be used to communicatively couple graphics subsystem 1015 and display 1020. For example, the interface may be any of a High-Definition Multimedia Interface, DisplayPort, wireless HDMI, and/or wireless HD compliant techniques. Graphics subsystem 1015 may be integrated into processor 1010 or chipset 1005. In some implementations, graphics subsystem 1015 may be a stand-alone device communicatively coupled to chipset 1005.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1018 may operate in accordance with one or more applicable standards in any version.

In various implementations, display 1020 may include any television type monitor or display. Display 1020 may include, for example, a computer display screen, touch screen display, video monitor, television-like device, and/or a television. Display 1020 may be digital and/or analog. In various implementations, display 1020 may be a holographic display. Also, display 1020 may be a transparent surface that may receive a visual projection. Such projections may convey various forms of information, images, and/or objects. For example, such projections may be a visual overlay for a mobile augmented reality (MAR) application. Under the control of one or more software applications 1016, platform 1002 may display user interface 1022 on display 1020.

In various implementations, content services device(s) 1030 may be hosted by any national, international and/or independent service and thus accessible to platform 1002 via the Internet, for example. Content services device(s) 1030 may be coupled to platform 1002 and/or to display 1020. Platform 1002 and/or content services device(s) 1030 may be coupled to a network 1060 to communicate (e.g., send and/or receive) media information to and from network 1060. Content delivery device(s) 1040 also may be coupled to platform 1002 and/or to display 1020.

In various implementations, content services device(s) 1030 may include a cable television box, personal computer, network, telephone, Internet enabled devices or appliance capable of delivering digital information and/or content, and any other similar device capable of uni-directionally or bi-directionally communicating content between content providers and platform 1002 and/display 1020, via network 1060 or directly. It will be appreciated that the content may be communicated uni-directionally and/or bi-directionally to and from any one of the components in system 1000 and a content provider via network 1060. Examples of content may include any media information including, for example, video, music, medical and gaming information, and so forth.

Content services device(s) 1030 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1002 may receive control signals from navigation controller 1050 having one or more navigation features. The navigation features of controller 1050 may be used to interact with user interface 1022, for example. In various embodiments, navigation controller 1050 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1050 may be replicated on a display (e.g., display 1020) by movements of a pointer, cursor, focus ring, or other visual indicators displayed on the display. For example, under the control of software applications 1016, the navigation features located on navigation controller 1050 may be mapped to virtual navigation features displayed on user interface 1022, for example. In various embodiments, controller 1050 may not be a separate component but may be integrated into platform 1002 and/or display 1020. The present disclosure, however, is not limited to the elements or in the context shown or described herein.

In various implementations, drivers (not shown) may include technology to enable users to instantly turn on and off platform 1002 like a television with the touch of a button after initial boot-up, when enabled, for example. Program logic may allow platform 1002 to stream content to media adaptors or other content services device(s) 1030 or content delivery device(s) 1040 even when the platform is turned "off." In addition, chipset 1005 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1000 may be integrated. For example, platform 1002 and content services device(s) 1030 may be integrated, or platform 1002 and content delivery device(s) 1040 may be integrated, or platform 1002, content services device(s) 1030, and content delivery device(s) 1040 may be integrated, for example. In various embodiments, platform 1002 and display 1020 may be an integrated unit. Display 1020 and content service device(s) 1030 may be integrated, or display 1020 and content delivery device(s) 1040 may be integrated, for example. These examples are not meant to limit the present disclosure.

In various embodiments, system 1000 may be implemented as a wireless system, a wired system, or a combination of both. When implemented as a wireless system, system 1000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1002 may establish one or more logical or physical channels to communicate information. The information may include media information and control information. Media information may refer to any data representing content meant for a user. Examples of content may include, for example, data from a voice conversation, videoconference, streaming video, electronic mail (email) message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 10.

Figure 11:
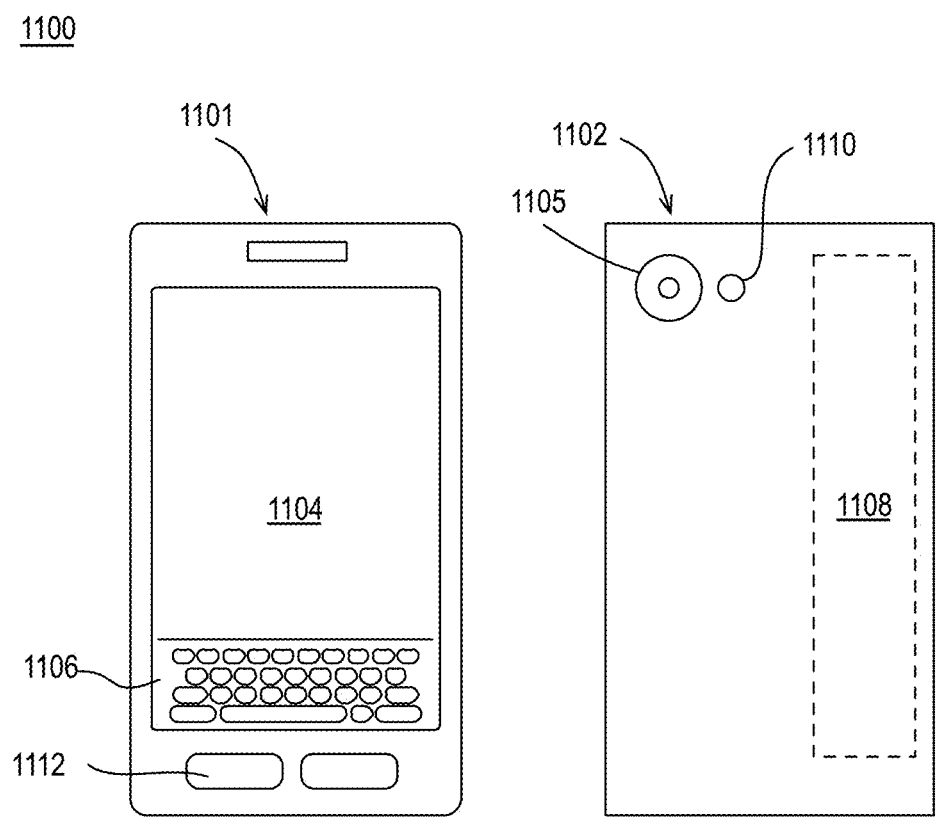
FIG. 11 illustrates an example small form factor device, all arranged in accordance with at least some implementations of the present disclosure.

As described above, system 1000 may be embodied in varying physical styles or form factors. FIG. 11 illustrates an example small form factor device 1100, arranged in accordance with at least some implementations of the present disclosure. In some examples, system 1000 may be implemented via device 1100. In various embodiments, for example, device 1100 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computers, finger computers, ring computers, eye-glass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 11, device 1100) may include a housing with a front 1101 and a back 1102. Device 1100 includes a display 1104, an input/output (I/O) device 1106, and an integrated antenna 1108. Device 1100 also may include navigation features 1112. I/O device 1106 may include any suitable I/O device for entering information into a mobile computing device. Examples for I/O device 1106 may include an alphanumeric keyboard, a numeric keypad, a touch pad, input keys, buttons, switches, microphones, speakers, voice recognition device and software, and so forth. Information also may be entered into device 1101 by way of microphone (not shown), or may be digitized by a voice recognition device. As shown, device 1100 may include a camera 1105 (e.g., including a lens, an aperture, and an imaging sensor) and a flash 1110 integrated into back 1102 (or elsewhere) of device 1100. In other examples, camera 1105 and flash 1110 may be integrated into front 1101 of device 1100 or both front and back cameras may be provided. Camera 1105 and flash 1110 may be components of a camera module to originate image data processed into streaming video that is output to display 1104 and/or communicated remotely from device 1100 via antenna 1108 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one or more first embodiments, a computer-implemented method for encoding graphics based video content for transmission and display via a remote device comprises collecting, from a graphics composition system, one or more graphics properties associated with one or more graphics layers of a frame of a video sequence, determining one or more encode settings for the frame of the video sequence based on the one or more graphics properties, and coding the frame of the video sequence for wireless transmission based on the one or more encode settings to generate an encoded frame.

Further to the first embodiments, the graphics properties comprise at least one of a geometry of a first graphics layer of the one or more graphics layers, a layer type of the first graphics layer, an update indicator corresponding to the first graphics layer, or a transform matrix corresponding to the first graphics layer.

Further to the first embodiments, the graphics properties comprise a size and shape of a first graphics layer of the graphics layers, an update indicator corresponding to the first graphics layer indicating the first graphics layer is updated in the frame, and a second update indicator corresponding to a second graphics layer of the graphics layers indicating the second graphics layer is not updated in the frame, and the encode settings comprise a coding mode setting of skip mode for all coding blocks of the second graphics layer.

Further to the first embodiments, the graphics properties comprise a size and shape of a first graphics layer of the graphics layers, an update indicator corresponding to the first graphics layer indicating the first graphics layer is updated in the frame, and a second update indicator corresponding to a second graphics layer of the graphics layers indicating the second graphics layer is not updated in the frame, the encode settings comprise a coding mode setting of skip mode for all coding blocks of the second graphics layer, and the one or more encode settings further comprise a second coding mode setting of intra mode for all second coding blocks of the second graphics layer.

Further to the first embodiments, the graphics properties comprise a size and shape of a first graphics layer of the graphics layers, an update indicator corresponding to the first graphics layer indicating the first graphics layer is updated in the frame, and a second update indicator corresponding to a second graphics layer of the graphics layers indicating the second graphics layer is not updated in the frame, the encode settings comprise a coding mode setting of skip mode for all coding blocks of the second graphics layer, and the one or more encode settings further comprise a high quality encode mode setting for the first graphics layer.

Further to the first embodiments, the graphics properties comprise a size and shape of a first graphics layer of the graphics layers, an update indicator corresponding to the first graphics layer indicating the first graphics layer is updated in the frame, and a second update indicator corresponding to a second graphics layer of the graphics layers indicating the second graphics layer is not updated in the frame, the encode settings comprise a coding mode setting of skip mode for all coding blocks of the second graphics layer, the one or more encode settings further comprise a high quality encode mode setting for the first graphics layer, and the high quality encode mode setting comprises an indictor to use a minimum available quantization parameter for the first graphics layer.

Further to the first embodiments, the graphics properties comprise a size and shape of a first graphics layer of the graphics layers, an update indicator corresponding to the first graphics layer indicating the first graphics layer is updated in the frame, and a second update indicator corresponding to a second graphics layer of the graphics layers indicating the second graphics layer is not updated in the frame, the encode settings comprise a coding mode setting of skip mode for all coding blocks of the second graphics layer, and the one or more encode settings further comprise a high quality encode mode setting for the first graphics layer and/or the high quality encode mode setting comprises an indictor to use a minimum available quantization parameter for the first graphics layer.

Further to the first embodiments, the graphics properties comprise a size and shape of a first graphics layer of the graphics layers, an update indicator corresponding to the first graphics layer indicating the first graphics layer is updated in the frame, and a second update indicator corresponding to a second graphics layer of the graphics layers indicating the second graphics layer is not updated in the frame, the encode settings comprise a coding mode setting of skip mode for all coding blocks of the second graphics layer, and the first graphics layer comprises a notification region and the second graphics layer comprises a background region.

Further to the first embodiments, the graphics properties comprise a size and shape of a first graphics layer of the graphics layers indicating the first graphics layer fills the frame, and the encode settings comprise a frame type setting of intra frame for the frame.

Further to the first embodiments, the graphics properties comprise a transform matrix for a first graphics layer of the graphics layers, the encode settings comprise a motion estimation setting of skip motion estimation for the first graphics layer, and coding the frame based on the motion estimation setting of skip motion estimation comprises performing motion compensation for the frame using motion vectors based on the transform matrix.

Further to the first embodiments, the graphics properties comprise a transform matrix for a first graphics layer of the graphics layers, the encode settings comprise a motion estimation setting of skip motion estimation for the first graphics layer, coding the flame based on the motion estimation setting of skip motion estimation comprises performing motion compensation for the frame using motion vectors based on the transform matrix, and the first graphics layer comprises a graphics layer generated by an animation process corresponding to the transform matrix.

In one or more second embodiments, a system for encoding graphics based video content for transmission and display via a remote device comprises a memory configured to store a video sequence and a processor coupled to the memory, the processor to collect one or more graphics properties associated with one or more graphics layers of a frame of a video sequence, determine one or more encode settings for the frame of the video sequence based on the one or more graphics properties, and code the frame of the video sequence for wireless transmission based on the one or more encode settings to generate an encoded frame.

Further to the second embodiments, the graphics properties comprise at least one of a geometry of a first graphics layer of the one or more graphics layers, a layer type of the first graphics layer, an update indicator corresponding to the first graphics layer, or a transform matrix corresponding to the first graphics layer.

Further to the second embodiments, the graphics properties comprise a size and shape of a first graphics layer of the graphics layers, an update indicator corresponding to the first graphics layer indicating the first graphics layer is updated in the frame, and a second update indicator corresponding to a second graphics layer of the graphics layers indicating the second graphics layer is not updated in the frame, and the encode settings comprise a coding mode setting of skip mode for all coding blocks of the second graphics layer.

Further to the second embodiments, the graphics properties comprise a size and shape of a first graphics layer of the graphics layers, an update indicator corresponding to the first graphics layer indicating the first graphics layer is updated in the frame, and a second update indicator corresponding to a second graphics layer of the graphics layers indicating the second graphics layer is not updated in the frame, and the encode settings comprise a coding mode setting of skip mode for all coding blocks of the second graphics layer, and the one or more encode settings further comprise a second coding mode setting of intra mode for all second coding blocks of the second graphics layer.

Further to the second embodiments, the graphics properties comprise a size and shape of a first graphics layer of the graphics layers, an update indicator corresponding to the first graphics layer indicating the first graphics layer is updated in the frame, and a second update indicator corresponding to a second graphics layer of the graphics layers indicating the second graphics layer is not updated in the frame, and the encode settings comprise a coding mode setting of skip mode for all coding blocks of the second graphics layer, and the one or more encode settings further comprise a high quality encode mode setting for the first graphics layer.

Further to the second embodiments, the graphics properties comprise a size and shape of a first graphics layer of the graphics layers, an update indicator corresponding to the first graphics layer indicating the first graphics layer is updated in the frame, and a second update indicator corresponding to a second graphics layer of the graphics layers indicating the second graphics layer is not updated in the frame, and the encode settings comprise a coding mode setting of skip mode for all coding blocks of the second graphics layer, and the one or more encode settings further comprise a high quality encode mode setting for the first graphics layer, and the high quality encode mode setting comprises an indictor to use a minimum available quantization parameter for the first graphics layer.

Further to the second embodiments, the graphics properties comprise a size and shape of a first graphics layer of the graphics layers, an update indicator corresponding to the first graphics layer indicating the first graphics layer is updated in the frame, and a second update indicator corresponding to a second graphics layer of the graphics layers indicating the second graphics layer is not updated in the frame, and the encode settings comprise a coding mode setting of skip mode for all coding blocks of the second graphics layer, and the one or more encode settings further comprise a second coding mode setting of intra mode for all second coding blocks of the second graphics layer and/or a high quality encode mode setting for the first graphics layer.

Further to the second embodiments, the graphics properties comprise a size and shape of a first graphics layer of the graphics layers, an update indicator corresponding to the first graphics layer indicating the first graphics layer is updated in the frame, and a second update indicator corresponding to a second graphics layer of the graphics layers indicating the second graphics layer is not updated in the frame, and the encode settings comprise a coding mode setting of skip mode for all coding blocks of the second graphics layer, and the first graphics layer comprises a notification region and the second graphics layer comprises a background region.

Further to the second embodiments, the graphics properties comprise a size and shape of a first graphics layer of the graphics layers indicating the first graphics layer fills the frame, and the encode settings comprise a frame type setting of intra frame for the frame.

Further to the second embodiments, the graphics properties comprise a transform matrix for a first graphics layer of the graphics layers, the encode settings comprise a motion estimation setting of skip motion estimation for the first graphics layer, and the processor to encode the frame based on the motion estimation setting of skip motion estimation comprises the processor to perform motion compensation for the frame using motion vectors based on the transform matrix.

Further to the second embodiments, the graphics properties comprise a transform matrix for a first graphics layer of the graphics layers, the encode settings comprise a motion estimation setting of skip motion estimation for the first graphics layer, and the processor to encode the frame based on the motion estimation setting of skip motion estimation comprises the processor to perform motion compensation for the frame using motion vectors based on the transform matrix, and the first graphics layer comprises a graphics layer generated by an animation process corresponding to the transform matrix.

In one or more third embodiments, a system comprises means for collecting, from a graphics composition system, one or more graphics properties associated with one or more graphics layers of a frame of a video sequence, means for determining one or more encode settings for the frame of the video sequence based on the one or more graphics properties, and means for coding the frame of the video sequence for wireless transmission based on the one or more encode settings to generate an encoded frame.

Further to the third embodiments, the graphics properties comprise at least one of a geometry of a first graphics layer of the one or more graphics layers, a layer type of the first graphics layer, an update indicator corresponding to the first graphics layer, or a transform matrix corresponding to the first graphics layer.

Further to the third embodiments, the graphics properties comprise a size and shape of a first graphics layer of the graphics layers, an update indicator corresponding to the first graphics layer indicating the first graphics layer is updated in the frame, and a second update indicator corresponding to a second graphics layer of the graphics layers indicating the second graphics layer is not updated in the frame, and the encode settings comprise a coding mode setting of skip mode for all coding blocks of the second graphics layer.

Further to the third embodiments, the graphics properties comprise a size and shape of a first graphics layer of the graphics layers, an update indicator corresponding to the first graphics layer indicating the first graphics layer is updated in the frame, and a second update indicator corresponding to a second graphics layer of the graphics layers indicating the second graphics layer is not updated in the frame, and the encode settings comprise a coding mode setting of skip mode for all coding blocks of the second graphics layer, and the one or more encode settings further comprise a second coding mode setting of intra mode for all second coding blocks of the second graphics layer.

Further to the third embodiments, the graphics properties comprise a size and shape of a first graphics layer of the graphics layers, an update indicator corresponding to the first graphics layer indicating the first graphics layer is updated in the frame, and a second update indicator corresponding to a second graphics layer of the graphics layers indicating the second graphics layer is not updated in the frame, and the encode settings comprise a coding mode setting of skip mode for all coding blocks of the second graphics layer, and the one or more encode settings further comprise a high quality encode mode setting for the first graphics layer.

Further to the third embodiments, the graphics properties comprise a size and shape of a first graphics layer of the graphics layers indicating the first graphics layer fills the frame, and the encode settings comprise a frame type setting of intra frame for the frame.

Further to the third embodiments, the graphics properties comprise a transform matrix for a first graphics layer of the graphics layers, the encode settings comprise a motion estimation setting of skip motion estimation for the first graphics layer, and the means for coding the frame based on the motion estimation setting of skip motion estimation comprise means for performing motion compensation for the frame using motion vectors based on the transform matrix.

In one or more fourth embodiments, at least one machine readable medium comprises a plurality of instructions that, in response to being executed on a computing device, cause the computing device to encode graphics based video content for transmission and display via a remote device by collecting, from a graphics composition system, one or more graphics properties associated with one or more graphics layers of a frame of a video sequence, determining one or more encode settings for the frame of the video sequence based on the one or more graphics properties, and coding the frame of the video sequence for wireless transmission based on the one or more encode settings to generate an encoded frame.

Further to the fourth embodiments, the graphics properties comprise at least one of a geometry of a first graphics layer of the one or more graphics layers, a layer type of the first graphics layer, an update indicator corresponding to the first graphics layer, or a transform matrix corresponding to the first graphics layer.

Further to the fourth embodiments, the graphics properties comprise a size and shape of a first graphics layer of the graphics layers, an update indicator corresponding to the first graphics layer indicating the first graphics layer is updated in the frame, and a second update indicator corresponding to a second graphics layer of the graphics layers indicating the second graphics layer is not updated in the frame, and the encode settings comprise a coding mode setting of skip mode for all coding blocks of the second graphics layer.

Further to the fourth embodiments, the graphics properties comprise a size and shape of a first graphics layer of the graphics layers, an update indicator corresponding to the first graphics layer indicating the first graphics layer is updated in the frame, and a second update indicator corresponding to a second graphics layer of the graphics layers indicating the second graphics layer is not updated in the frame, and the encode settings comprise a coding mode setting of skip mode for all coding blocks of the second graphics layer, and the one or more encode settings further comprise a second coding mode setting of intra mode for all second coding blocks of the second graphics layer.

Further to the fourth embodiments, the graphics properties comprise a size and shape of a first graphics layer of the graphics layers, an update indicator corresponding to the first graphics layer indicating the first graphics layer is updated in the frame, and a second update indicator corresponding to a second graphics layer of the graphics layers indicating the second graphics layer is not updated in the frame, and the encode settings comprise a coding mode setting of skip mode for all coding blocks of the second graphics layer, and the one or more encode settings further comprise a high quality encode mode setting for the first graphics layer.

Further to the fourth embodiments, the graphics properties comprise a size and shape of a first graphics layer of the graphics layers indicating the first graphics layer fills the frame, and the encode settings comprise a frame type setting of intra frame for the frame.

Further to the fourth embodiments, the graphics properties comprise a transform matrix for a first graphics layer of the graphics layers, the encode settings comprise a motion estimation setting of skip motion estimation for the first graphics layer, and coding the frame based on the motion estimation setting of skip motion estimation comprises performing motion compensation for the frame using motion vectors based on the transform matrix.

In one or more fifth embodiments, at least one machine readable medium may include a plurality of instructions that, in response to being executed on a computing device, causes the computing device to perform a method according to any one of the above embodiments.

In one or more sixth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A computer-implemented method for encoding graphics based video content for transmission and display via a remote device comprising:
    collecting, from a graphics composition system, graphics properties associated with two or more graphics layers of a frame of a video sequence, wherein the graphics properties comprise a size and shape of a first graphics layer of the graphics layers, an update indicator corresponding to the first graphics layer indicating the first graphics layer is updated in the frame, and a second update indicator corresponding to a second graphics layer of the graphics layers indicating the second graphics layer is not updated in the frame, wherein the first graphics layer comprises a notification region and the second graphics layer comprises a background region;
    determining one or more encode settings for the frame of the video sequence based on the graphics properties, wherein the encode settings comprise a coding mode setting of skip mode for all coding blocks of the second graphics layer; and
    coding the frame of the video sequence for wireless transmission based on the one or more encode settings to generate an encoded frame.

2. The method of claim 1, wherein the graphics properties further comprise at least one of a layer type of the first graphics layer or a transform matrix corresponding to a third graphics layer.

3. The method of claim 1, wherein the one or more encode settings further comprise a second coding mode setting of intra mode for all coding blocks of the first graphics layer.

4. The method of claim 1, wherein the one or more encode settings further comprise a high quality encode mode setting for the first graphics layer.

5. The method of claim 4, wherein the high quality encode mode setting comprises an indictor to use a minimum available quantization parameter for the first graphics layer.

6. The method of claim 1, further comprising:
    collecting, from the graphics composition system, second graphics properties associated with one or more graphics layers of a second frame of the video sequence, wherein the second graphics properties comprise a size and shape of a first graphics layer of the second graphics layers indicating the first graphics layer of the second graphics layers fills the second frame; and
    determining one or more second encode settings for the second frame based on the one or more second graphics properties, wherein the second encode settings comprise a frame type setting of intra frame for the second frame.

7. The method of claim 1, wherein the graphics properties further comprise a transform matrix for a third graphics layer of the graphics layers, the encode settings comprise a motion estimation setting of skip motion estimation for the third graphics layer, and coding the frame based on the motion estimation setting of skip motion estimation comprises performing motion compensation for the frame using motion vectors based on the transform matrix.

8. The method of claim 7, wherein the third graphics layer comprises a graphics layer generated by an animation process corresponding to the transform matrix.

9. A system for encoding graphics based video content for transmission and display via a remote device comprising:
a memory configured to store a video sequence; and
a processor coupled to the memory, the processor to
collect graphics properties associated with two or more graphics layers of a frame of a video sequence, wherein the graphics properties comprise a size and shape of a first graphics layer of the graphics layers, an update indicator corresponding to the first graphics layer indicating the first graphics layer is updated in the frame, and a second update indicator corresponding to a second graphics layer of the graphics layers indicating the second graphics layer is not updated in the frame, wherein the first graphics layer comprises a notification region and the second graphics layer comprises a background region, to determine one or more encode settings for the frame of the video sequence based on the graphics properties, wherein the encode settings comprise a coding mode setting of skip mode for all coding blocks of the second graphics layer, and to code the frame of the video sequence for wireless transmission based on the one or more encode settings to generate an encoded frame.

10. The system of claim 9, wherein the graphics properties further comprise at least one of a layer type of the first graphics layer or a transform matrix corresponding to a third graphics layer.

11. The system of claim 9, wherein the one or more encode settings further comprise a second coding mode setting of intra mode for all coding blocks of the first graphics layer.

12. The system of claim 9, wherein the one or more encode settings further comprise a high quality encode mode setting for the first graphics layer.

13. The system of claim 9, wherein the processor is further to collect second graphics properties associated with one or more graphics layers of a second frame of the video sequence, wherein the second graphics properties comprise a size and shape of a first graphics layer of the second graphics layers indicating the first graphics layer of the second graphics layers fills the second frame, and to determine one or more second encode settings for the second frame based on the one or more second graphics properties, wherein the second encode settings comprise a frame type setting of intra frame for the second frame.

14. The system of claim 9, wherein the graphics properties further comprise a transform matrix for a third graphics layer of the graphics layers, the encode settings comprise a motion estimation setting of skip motion estimation for the third graphics layer, and the processor to code the frame based on the motion estimation setting of skip motion estimation comprises the processor to perform motion compensation for the frame using motion vectors based on the transform matrix.

15. At least one non-transitory machine readable medium comprising a plurality of instructions that, in response to being executed on a computing device, cause the computing device to encode graphics based video content for transmission and display via a remote device by:
collecting, from a graphics composition system, graphics properties associated with two or more graphics layers of a frame of a video sequence, wherein the graphics properties comprise a size and shape of a first graphics layer of the graphics layers, an update indicator corresponding to the first graphics layer indicating the first graphics layer is updated in the frame, and a second update indicator corresponding to a second graphics layer of the graphics layers indicating the second graphics layer is not updated in the frame, wherein the first graphics layer comprises a notification region and the second graphics layer comprises a background region;
determining one or more encode settings for the frame of the video sequence based on the graphics properties, wherein the encode settings comprise a coding mode setting of skip mode for all coding blocks of the second graphics layer; and
coding the frame of the video sequence for wireless transmission based on the one or more encode settings to generate an encoded frame.

16. The non-transitory machine readable medium of claim 15, wherein the graphics properties further comprise at least one of a layer type of the first graphics layer or a transform matrix corresponding to a third graphics layer.

17. The non-transitory machine readable medium of claim 15, wherein the one or more encode settings further comprise a second coding mode setting of intra mode for all coding blocks of the first graphics layer.

18. The non-transitory machine readable medium of claim 15, wherein the one or more encode settings further comprise a high quality encode mode setting for the first graphics layer.

19. The non-transitory machine readable medium of claim 15, comprising further instructions that, in response to being executed on the computing device, cause the computing device to encode graphics based video content for transmission and display via the remote device by:
collecting, from the graphics composition system, second graphics properties associated with one or more graphics layers of a second frame of the video sequence, wherein the second graphics properties comprise a size and shape of a first graphics layer of the second graphics layers indicating the first graphics layer of the second graphics layers fills the second frame; and
determining one or more second encode settings for the second frame based on the one or more second graphics properties, wherein the second encode settings comprise a frame type setting of intra frame for the second frame.

20. The non-transitory machine readable medium of claim 15, wherein the graphics properties further comprise a transform matrix for a third graphics layer of the graphics layers, the encode settings comprise a motion estimation setting of skip motion estimation for the third graphics layer, and coding the frame based on the motion estimation setting of skip motion estimation comprises performing motion compensation for the frame using motion vectors based on the transform matrix.

* * * * *